US011887500B2

(12) United States Patent
Lesser

(10) Patent No.: US 11,887,500 B2
(45) Date of Patent: Jan. 30, 2024

(54) EDUCATIONAL AID

(71) Applicant: Dovid Lesser, Brooklyn, NY (US)

(72) Inventor: Dovid Lesser, Brooklyn, NY (US)

( * ) Notice: Subject to any disclaimer, the term of this patent is extended or adjusted under 35 U.S.C. 154(b) by 350 days.

(21) Appl. No.: 16/893,775

(22) Filed: Jun. 5, 2020

(65) Prior Publication Data

US 2020/0402421 A1 Dec. 24, 2020

Related U.S. Application Data

(60) Provisional application No. 62/857,522, filed on Jun. 5, 2019.

(51) Int. Cl.
*G09B 19/08* (2006.01)
*G06K 7/12* (2006.01)
*G09B 1/16* (2006.01)

(52) U.S. Cl.
CPC .............. *G09B 19/08* (2013.01); *G06K 7/12* (2013.01); *G09B 1/16* (2013.01)

(58) Field of Classification Search
CPC ........ G09B 3/045; G09B 3/085; G09B 17/00; G09B 17/02; G09B 19/08
USPC ................................. 434/327, 331, 346, 338
See application file for complete search history.

(56) References Cited

U.S. PATENT DOCUMENTS

| | | | | |
|---|---|---|---|---|
| 3,225,457 A | * | 12/1965 | Schure ................... | G09B 3/085 40/445 |
| 3,248,050 A | * | 4/1966 | Dickson .................. | G06C 3/00 235/89 R |
| 3,281,960 A | * | 11/1966 | Gross ..................... | G09B 3/085 434/331 |
| 3,302,306 A | * | 2/1967 | Peterson ................ | G09B 3/085 434/331 |
| 3,327,406 A | * | 6/1967 | Baker .................... | G09B 3/085 273/293 |
| 3,359,651 A | * | 12/1967 | Mair ....................... | G09B 3/04 434/328 |
| 3,638,335 A | * | 2/1972 | Gundersen ............. | G09B 11/04 434/162 |
| 4,188,431 A | * | 2/1980 | Sokol .................... | C09D 11/50 428/199 |
| 4,604,065 A | * | 8/1986 | Frazer ................... | G09B 7/063 434/338 |
| 4,891,011 A | * | 1/1990 | Cook ..................... | G09B 19/06 283/89 |
| 5,145,376 A | * | 9/1992 | Krass .................... | G09B 19/06 434/157 |

(Continued)

*Primary Examiner* — Kurt Fernstrom
(74) *Attorney, Agent, or Firm* — Israel Nissenbaum; Yitzy Nissenbaum

(57) ABSTRACT

A method for controllable toggling viewing of written materials with adjuvant or explanatory notation material as a teaching or memorization tool. The method comprises the steps of imprinting adjuvant or explanatory notation materials adjacent to or in close conjunction with a visible text or notation, as a non visible or an invisible imprint. The non visible invisible adjuvant or explanatory notation material is made to become temporarily visible or viewable with a heat source or a viewing device for a controlled desired period of time by using the visible adjuvant or explanatory notation to perform a reading or writing function. Removing the viewing device or reducing heat renders the adjuvant or explanatory notation non visible or invisible.

7 Claims, 5 Drawing Sheets

(56) References Cited

U.S. PATENT DOCUMENTS

| | | | | | |
|---|---|---|---|---|---|
| 5,199,680 | A * | 4/1993 | Rivera | ................. | A47B 23/007 |
| | | | | | 248/458 |
| 5,282,749 | A * | 2/1994 | Ketch | .................... | A41D 27/08 |
| | | | | | 2/243.1 |
| 5,884,888 | A * | 3/1999 | Grimes, III | ......... | F21V 33/0048 |
| | | | | | 248/441.1 |
| 6,053,741 | A * | 4/2000 | Wood | ..................... | G09B 19/02 |
| | | | | | 434/327 |
| 6,079,857 | A * | 6/2000 | Mendelsohn | ........... | F21V 21/28 |
| | | | | | 362/427 |
| 6,808,153 | B1 * | 10/2004 | Kelley | ................... | A47B 19/10 |
| | | | | | 248/188.7 |
| 6,821,002 | B1 * | 11/2004 | Morgen | .................. | G09F 13/04 |
| | | | | | 362/354 |
| 6,832,915 | B1 * | 12/2004 | Kirby | ..................... | G09B 17/02 |
| | | | | | 40/352 |
| 7,198,382 | B2 * | 4/2007 | Donovan | ............... | B42D 3/123 |
| | | | | | 362/184 |
| 7,277,241 | B1 * | 10/2007 | Fulton | ...................... | B42D 3/12 |
| | | | | | 281/31 |
| 7,341,456 | B2 * | 3/2008 | McAdams | ........... | G09B 21/006 |
| | | | | | 235/472.01 |
| 7,931,304 | B2 * | 4/2011 | Brown | ..................... | G07F 7/02 |
| | | | | | 283/67 |
| 8,047,670 | B2 * | 11/2011 | Patrick | ................. | F21V 21/145 |
| | | | | | 362/188 |
| 8,449,302 | B1 * | 5/2013 | Carahan | .................. | A63F 3/065 |
| | | | | | 273/293 |
| 2005/0170324 | A1 * | 8/2005 | Yu | ........................... | G09B 3/02 |
| | | | | | 434/331 |
| 2006/0224957 | A1 * | 10/2006 | Jense | ..................... | G09B 3/085 |
| | | | | | 715/234 |

* cited by examiner

FIG. 1
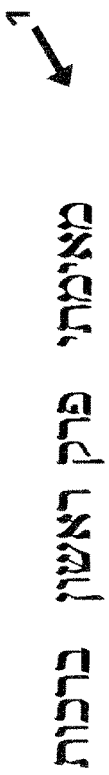
FIG. 2
מֵאֵימָתַי
From When
מֵאֵימָתַי | קוֹרִין | אֶת | שְׁמַע | בְּעַרְבִית |  | can you recite
From When | from the time | in the evening | Shemah | the
מִשָּׁעָה | שֶׁהַכֹּהֲנִים | נִכְנָסִים | לֶאֱכוֹל | בִּתְרוּמָתָן
that the priests

Apple

Sam put down the apples, ← 15
bananas and peaches.
       ↑
       16

17
Review sheets - test prep

Who was the first
president?

_____
G. Washington ← 18
FIG 4B

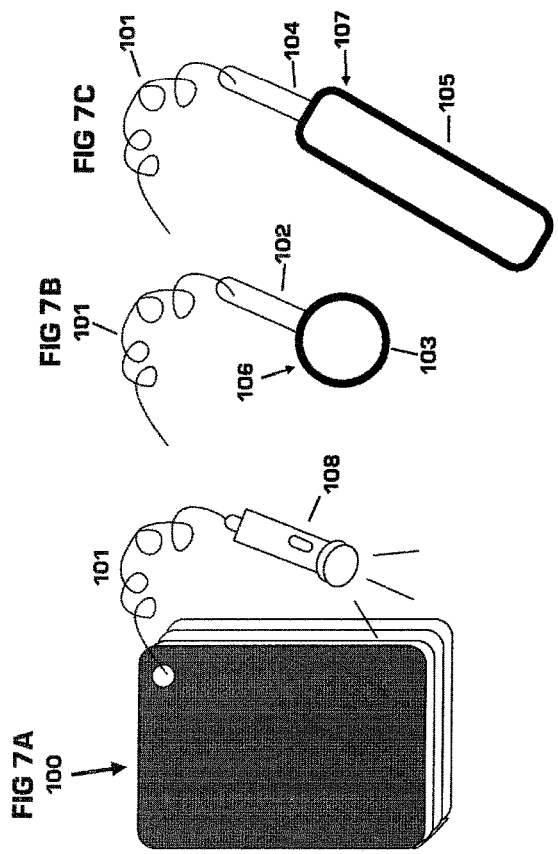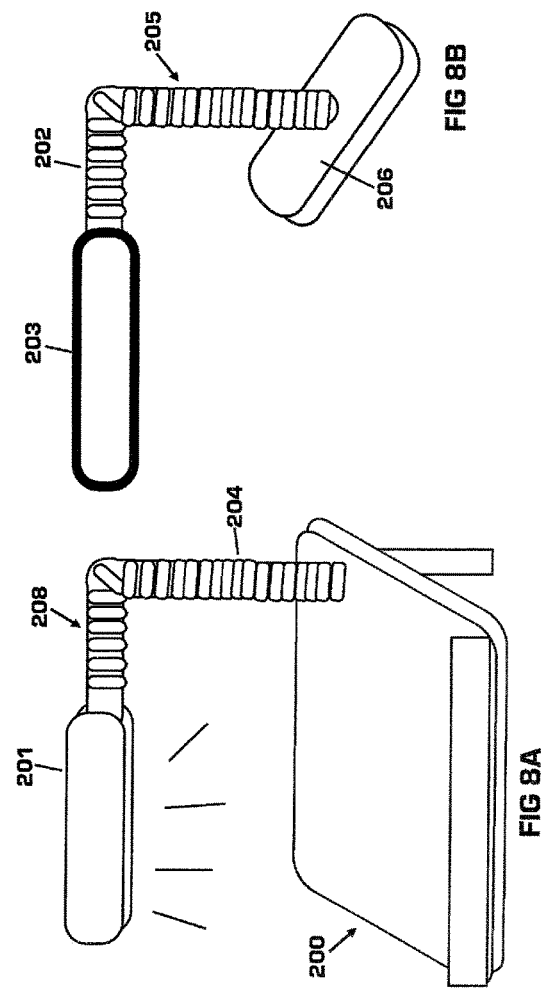

EDUCATIONAL AID

FIELD OF THE INVENTION

This invention relates to written materials on paper or similar writing or printing substrates with integrated educational assistance writing or images and particularly to such written materials in juxtaposition with controlled visibility assistance writing or images.

BACKGROUND

Examples of written materials, requiring an understanding of unwritten adjuvant notations, are Hebrew scrolls and the Talmud which is written in Hebrew and Aramaic. Both Hebrew and Aramaic words require the use of extra notations "nekudos", which provide the function of vowelization. However, Hebrew scroll texts and normal editions of Talmud omit the vowelization and a reader must either memorize the appropriate usage or, must become aware of the difficult grammatical and usage requirements. In addition, Hebrew scrolls also utilize cantillations, with notations, to indicate proper accenting, melody and chanting when being read in public. It has accordingly been the custom and procedure to use side by side texts with and without vowelization and notations in order to acclimate a reader to remember proper vowelization and cantillation notations.

Other educational applications include textbook and other homework applications where a student is required to search or leaf to different areas or pages to see answers to problems in whole or in part.

Foreign language materials often require inter linear translations or separate page translations which, while useful, tend to clutter up pages and engender difficulties in reading.

SUMMARY OF THE INVENTION

Generally, the present invention comprises a method for controllable toggling viewing of written materials with adjuvant or explanatory notation material as a teaching or memorization tool.

The method comprises the steps of
a) imprinting adjuvant or explanatory notation materials adjacent to or in close conjunction with a visible text or notation, as a non visible or invisible imprint;
b) selectively causing the non visible or invisible adjuvant or explanatory notation material to become temporarily visible or viewable with a viewing means such as heat or device for a controlled desired period of time;
c) using the visible adjuvant or explanatory notation to perform a reading or writing function;
d) rendering the non visible adjuvant or explanatory material non visible or removing the viewing device, thereby rendering adjuvant or explanatory notation invisible; and
e) repeating steps b through d as needed or desired.

In an embodiment, the invisible adjuvant or explanatory material is imprinted with a UV readable invisible ink or with an invisible ink which is readable with a special lens. The UV readable invisible ink is viewable under light from a UV lamp or bulb and is only visible through UV light. Alternatively, the invisible ink is visible only with a special tinted lens. Special paper such as gray paper makes such latter ink more visible by increasing contrast.

A type of UV ink is UV reactive Ink which turns into a specific color, such as red or green when exposed to UV light and it remains visible for a number of seconds even after light is removed. Another type of UV reactive ink glows in the dark when exposed to UV light and it remains glowing for a number of seconds even after light is removed. Still another invisible ink is one that is not visible under lighted conditions but which glows in darkness which is still sufficiently lighted to see normal text.

In another embodiment, the adjuvant or explanatory material is imprinted with an ordinary visible ink but which visible ink is made non visible by camouflaging it with a heat sensitive ink which changes color with the application of heat such as a warm finger. With heat application, the hidden ink, which is of a different color or hue, becomes visible, as a contrast to the heated heat sensitive ink. Gradual cooling returns the heat sensitive ink to its camouflaging state. Typical heating activation is effected at over 88 degrees F. and typical skin temperature is over 90 degrees F. A common use of this type of heat sensitive ink is in novelty ceramic coffee mugs with the heat sensitive ink being imbedded in the ceramic of the cup to provide a normally dark or black appearance. A message or statement printed with a non heat sensitive ink material is also provided on or in the ceramic, with such message or statement (such as the chemical structural formula of caffeine) being subsumed in the dark color of the heat sensitive ink. When hot coffee or other liquid is poured into the cup, the heat sensitive ink appears to disappear and the message becomes visible as long as the cup retains a heating activation temperature. When the cup cools, the heat sensitive ink resumes its original appearance. Selective placement of the heat sensitive ink within the poorly conductive ceramic serves to enable adjustment of the activation temperature at or near the boiling point of water. A heat sensitive ink of this type is capable of obscuring sensitive information until heated, such as with a constantly available finger, for quick reference. The sensitive material, such as a security code on a credit card, is re-obscured with immediate cooling.

In an embodiment, the non visible or invisible adjuvant or explanatory notation material, is used herein as an educational tool for developing reading skills wherein the invisible or non visible ink is used, in conjunction with educational materials, to provide reading or visual aids not normally visible with an easy toggling on/off effect. It is used, for example, as an aid in memorization or as an explanatory/translation function or as an aid in drawing or providing an immediate answer to questions. The viewing device (a heat providing means with respect to heat sensitive ink is considered a "viewing device" as defined herein) provides controlled temporary viewing, unlike invisible notations such as with children's coloring books, which require messy application of liquids to render them visible, often in a permanent manner.

In accordance with the invention, the reading or text material is imprinted with an overlay of adjuvant material such as symbols and notations with a proper positioning relative to existing visible text such as "nekudos" being positioned under or adjacent to Hebrew lettering, as appropriate. Similarly, cantillations are positioned above or below letters at stress points. Translations are positioned below words or phrases or in any other position conductive to ease in conjoined toggled reading. For facilitated reading and recognition of notations made visible it is desirable that these notations be in a different color such as red in contrast to normal black printing ink.

A UV flashlight, which makes UV sensitive invisible ink temporarily visible, is judiciously used, when needed, in order to develop reading skills and material understanding by providing closely juxtaposed answers or notations, in a palatable manner which is both pleasant and exciting. An additional feature is that children will no longer face embarrassment for using lower level reading material and enables a student or reader to put in personal effort for understanding and aid and only to reach out for help when feeling a need.

Alternatively, lenses currently used primarily for magic tricks and for cheating purposes (e.g., marked playing cards) may be utilized. These lenses (commercially available as glasses and contact lenses) are made to see in the same spectrum as the lens-visible invisible ink, a spectrum not visible to the naked eye. In operation, the glasses or lenses allow seeing of the contrast between paper and ink. For greater flexibility in use, the specially treated lenses may be held in a manner akin to magnifying glasses and sheets rather than being worn. Other lenses which are not worn such as in magnifying glass configurations of round, rectangular or even full sheet lenses are useful herein. The current uses for such inks generally comprise detection or identification but do not involve utilization of hidden or invisible notations in conjunction with visible notations or text nor do they involve any requisite juxtaposition between the notations or texts.

Examples of educational and similar applications for which the invisible ink imprinting is useful include (but is not limited thereto) the selective viewing of:

1 "Nekudos" or proper vowelization for hebrew text;
2 interlinear translation under the text;
3 grammatical symbols showing proper usage, accenting and pronunciation;
4 math related pictures and examples for fuller understanding of concepts expressed only in words;
5 pictures for reading so that a child is able to verify whether a word is read correctly;
6 answers to questions in invisible ink in text books and work books to enable students to immediately verify whether the questions were answered correctly;
7 answers to questions in invisible ink on personal worksheets from teachers so students can see if they answered correctly;
8 sheets of paper with invisible alphabet letters or pictures to assist students in tracing them
9 memory games with invisible ink;
10 obscuring of sensitive information such as credit card security codes.

In conjunction with the written materials for use such as with the UV light and lens embodiments it is desirable that a stand be used to hold the written materials with an attached and position movable UV light or lens to enable the invisible materials to be discerned in a viable and comfortable manner. Alternatively, UV light sources such as specialized flashlights and lenses may be tethered to the reading materials.

Various means for application of the invisible ink are possible such as manually, with limited number of notations, with stencil overlays and with computer generation with spread sheet merging and the use of ink-jet printers having dedicated ink jet cartridges containing the invisible ink which are commercially available such as from Hewlett Packard for its ink jet printers.

The writing sheets may either be of typical paper or may be of easily erasable laminated material which can retain writing.

The use of the heat sensitive ink embodiment enables the "viewing device" to be a simple heat-providing finger, without the necessity of actual physical devices such as lenses or light sources.

The above discussion and the attached drawings further illustrate and assist in the understanding of the invention wherein the drawings are:

SHORT DESCRIPTION OF THE DRAWINGS

FIG. 1 illustrates the invention with a segment of a page from the Jewish Talmud with partial vowelization and translation as indicated in visible invisible ink subject to viewing with UV lighting or treated lenses;

FIG. 2 is an excerpt of the initial lines of the Hebrew text of FIG. 1, with translation lines made visible with UV lighting or treated lenses;

FIGS. 3A and 3B depict a mathematical equation with elements made visible (FIG. 3A) and with the answer solving the equation made visible (FIG. 3B);

FIG. 3C illustrates a word, with a visual image of an item associated with the word being made visible;

FIGS. 4A and 4B show sentences with spelling grammatical corrections made visible (FIG. 4A) and with an answer to a question made visible (FIG. 4B);

Figure 6:
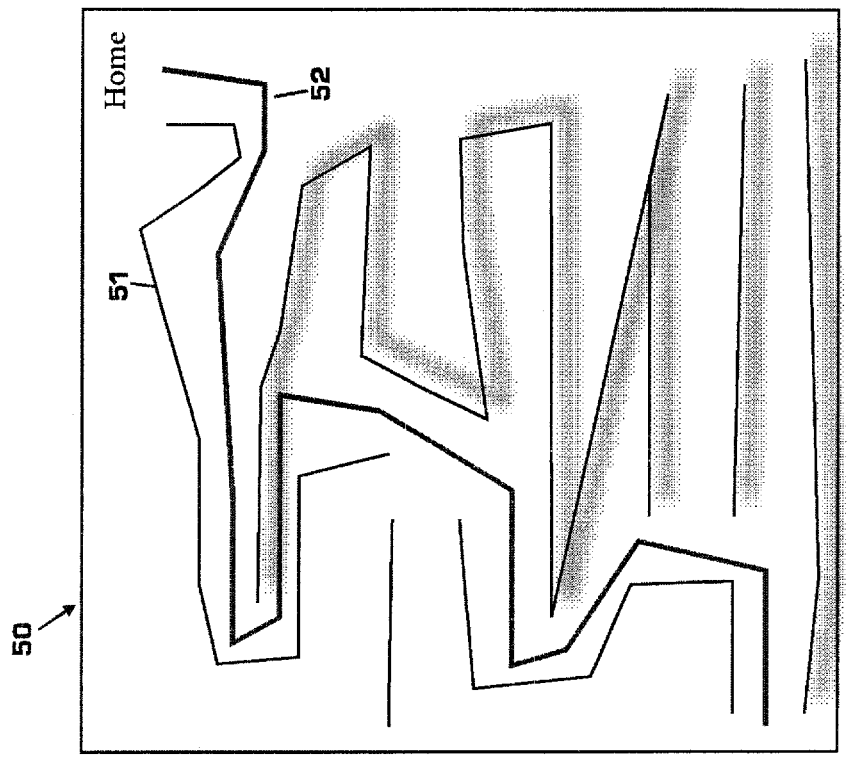
Figure 5:
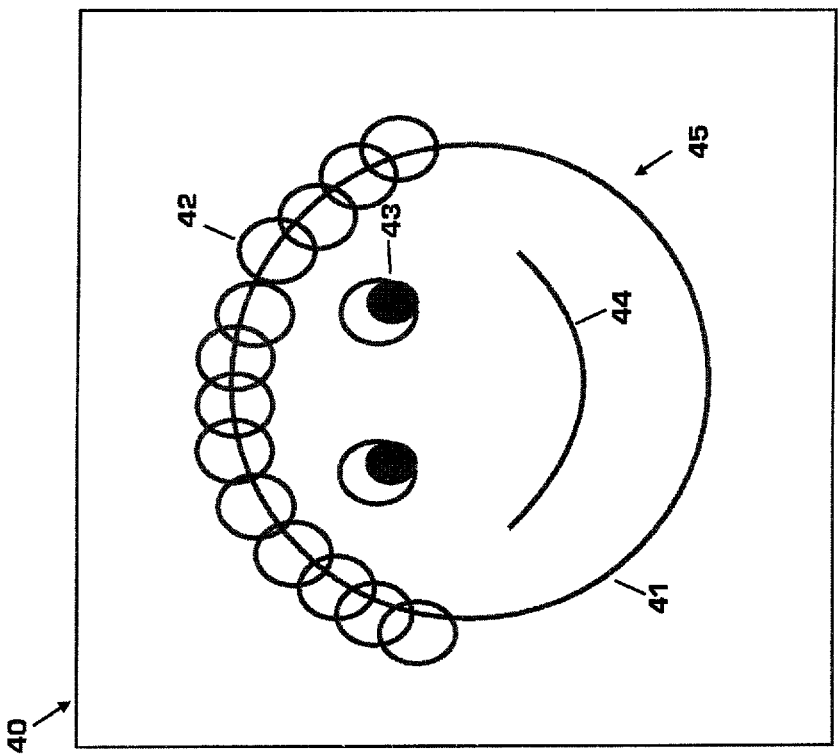
Figure 9A:
Figure 9B:
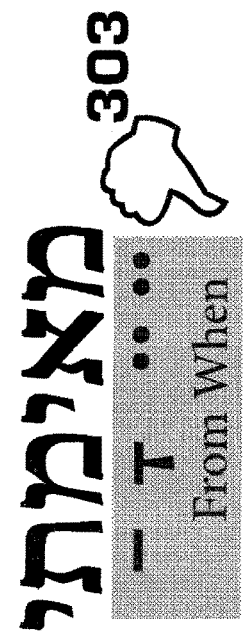

FIG. 5 depicts a drawing made visible for tracing thereon;
FIG. 6 shows a maze, with a solved path made visible;
FIGS. 7A, 7B, 7C depict a book with an attached UV flashlight (FIG. 7A), a round invisible ink reading lens (FIG. 7B) and a full line or paragraph lens (FIG. 7C);

FIGS. 8A and 8B show a goose neck UV light on a book stand (FIG. 8A) and a free standing goose neck invisible ink reading lens; and FIGS. 9A and 9B illustrate an explanatory or adjuvant notation material, as in FIG. 2, camouflaged (i.e. not visible) with a heat sensitive ink (FIG. 9A) which notation material is made visible with heat exerted by a finger (FIG. 9B).

DETAILED DESCRIPTION

FIG. 1 depicts a portion of the first page 1 of a Jewish Talmud tractate. The Hebrew lettering and words on the page are generally without vowels, though some are shown at 3 in the form of diacritical marks such as dots and dashes underneath or adjacent the Hebrew letters. A Talmudic scholar is expected to understand the nature of the missing vowels. However, a novice or beginning student is generally at a loss regarding the nature of the vowels which can often determine or change meaning. In accordance with the invention, the page is printed with a stencil or other positioning location methods, with invisible ink in the form of the missing vowels. If the ink is UV-sensitive, it is made temporarily visible by UV light such as shown at 2 or is visible with an appropriate lens.

In addition to missing vowelization, the Talmud, for non Hebrew or Aramaic knowledgeable students, is often cryptic without translation. Accordingly, there are many interlinear or other types of translations currently available in texts. These, however, often serve as a learning crutch without the ready imparting of actual independent understanding. Accordingly, as illustrated in FIG. 2, the Hebrew text is provided with vowels 4 and translations in invisible ink which are ephemeral (only visible with UV light or an appropriate lens) whereby, once the vowels and translations are digested, they are removed until the student is able to know and understand the vowelization and translation, without textual assistance.

In other applications, as shown in FIGS. 3A-C and 4A-B (in a simplified basic form), an equation 10 is provided with invisible ink made visible to illustrate real objects such as the apples 11 in FIG. 3A which are cumulated (in the addition shown) and with the answer 14 shown in FIG. 3B.

FIGS. 4A and 4B show, when subjected UV light or under a special lens (depending on the invisible ink used) grammatical and spelling corrections to sentences at 15, 16 and 17 41, curly hair 42, as an answer to the question posed in FIG. 4B, FIGS. 5 and 6 show other applications wherein a normally blank sheet of paper 40 is hit with UV light or is viewed under a proper lens (depending on the invisible ink type used) to expose fanciful face 45 with outline 41, curly hair 42, eyes 43 and mouth 44, all of which remain visible for tracing a permanent picture thereon. FIG. 6 depicts a sheet 50 with a visible maze 51, wherein a UV light or special lens makes visible 52 which solves the maze.

Examples of viewing devices (either by making invisible UV ink visible or by direct viewing with a special lens) are shown in FIGS. 7A through 8B. A book 100 is shown in FIG. 7A with a directly connected UV flashlight 101 with connection 101'. The book 100, contains text or pictures with invisible markings which become visible under the UV light of flashlight 101. These invisible markings provide explanations or reading help and the like on a temporary basis as long as the UV light shines on the invisible markings (and possibly for a few seconds thereafter). FIG. 8B shows UV light 201 fixed by an adjustable goose neck connection 204 to book stand 200. UV light 201 is thereby adjustably movable to direct juxtaposition on a paper sheet or book placed on the book stand 200 to light up and make invisible markings viewable, as needed. Lens element 203 of lens 205 in FIG. 8B is fixed to weighted base stand 206 by adjustably positioned goose neck 202.

Special viewing lenses 103, 105 and 203 in FIGS. 7B, 7C and 8B are used to view specially viewable invisible markings. Round lens 103 and handle 102 in FIG. 7B is similarly connected by connector 101' to book 100. The round lens enables viewing of invisible ink in specific areas of the book text. The elongated lens 105 in FIG. 7C (as well as the lens 203 in FIG. 8B) enables full line or paragraph viewing.

In FIG. 9A, the Hebrew text of FIG. 2 is provided with a dark area 300 comprised of dark heat sensitive ink 301 with writing 302 (visible in FIG. 9B) camouflaged therein (shown in slight outline for illustrative purposes) and not normally visible. With a heat source, shown as thumb 303, in FIG. 9B being applied to the heat sensitive ink 301, the camouflaged or obscured writing becomes temporarily visible.

It is understood that the above description and drawings are only illustrative of the invention and that changes in materials and application may be made without departing from the scope of the invention as defined in the following claims.

What is claimed is:

1. A method for controllable toggling viewing of written materials with adjuvant or explanatory notation material as a teaching or memorization tool, wherein the method comprises the steps of:
   i) imprinting adjuvant or explanatory notation materials adjacent to or in close conjunction with a visible text or notation, as a non visible or an invisible imprint;
   ii) selectively causing the non visible or invisible adjuvant or explanatory notation material to become temporarily visible or viewable with a viewing means for a controlled desired period of time;
   iii) using the visible adjuvant or explanatory notation to perform a reading or writing function;
   iv) removing the viewing means, thereby rendering adjuvant or explanatory notation invisible; and
   v) repeating steps ii through iv as needed or desired
   wherein the non visible imprint comprises a visible imprint camouflaged from view by being integrated with a heat sensitive ink and wherein the viewing means comprises application of heat to the heat sensitive ink at an activation temperature sufficient to change the color or hue of the heat sensitive ink whereby the non visible imprint becomes visible by contrast thereto and the step of rendering the adjuvant or explanatory notation invisible comprises removing application of heat allowing the heat sensitive ink to cool below the activation temperature.

2. The method of claim 1, wherein invisible adjuvant or explanatory notation material comprises at least one of vowelization and cantillation notations positioned at a normal site for reading with the visible text or notation, when the invisible adjuvant or explanatory notation material is made visible.

3. The method of claim 1, wherein the invisible adjuvant or explanatory notation material comprises a translation or explanation of the adjacent visible text or notation.

4. The method of claim 1, wherein the invisible adjuvant or explanatory notation material comprises an answer to a question posed by an adjacent visible text or notation.

5. The method of claim 1, wherein the invisible adjuvant or explanatory notation material comprises a drawing which can be traced when made visible.

6. The method of claim 1, wherein the invisible adjuvant or explanatory notation material comprises grammatical or spelling correction of visible text.

7. The method of claim 1, wherein the activation temperature is at or below normal human skin temperature and the application of heat is effected by applying human skin to the heat sensitive ink.

\* \* \* \* \*